(No Model.)

R. ATWATER.
QUOIN.

No. 434,906. Patented Aug. 26, 1890.

Witnesses
E. A. Smith
H. V. Cushman

Inventor
Richard Atwater
By his Attorney
Arthur W. Harrison

UNITED STATES PATENT OFFICE.

RICHARD ATWATER, OF MERIDEN, CONNECTICUT.

QUOIN.

SPECIFICATION forming part of Letters Patent No. 434,906, dated August 26, 1890.

Application filed December 26, 1889. Serial No. 335,022. (No model.)

*To all whom it may concern:*

Be it known that I, RICHARD ATWATER, of Meriden, in the county of New Haven and State of Connecticut, have invented new and useful Improvements in Quoins; and I do hereby declare the following to be a full, clear, and exact description of said invention, reference being had to the accompanying drawings, and to the letters of reference marked thereon, which form a part of this specification.

My invention relates to improvements in quoins for printers' use; and my object is to produce a quoin possessing the requisite convenience, compactness, durability, purchase, simplicity, strength, and particularly safety. This object or these objects are attained by my invention, which consists in the construction and combination of parts, as hereinafter described, and pointed out in the claims.

Figure 1:
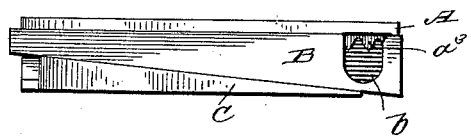
Figure 2:
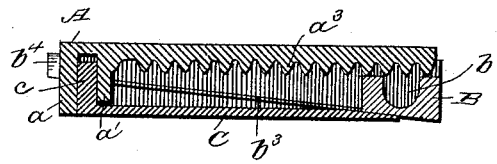
Figure 3:
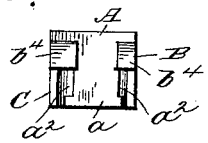
Figure 3:
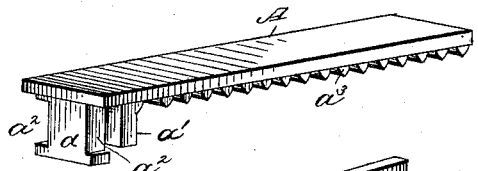
Figure 4:
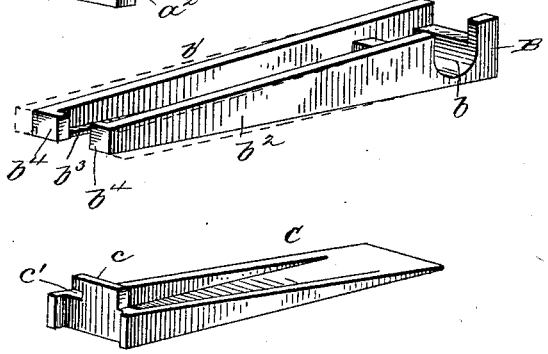

In the drawings which accompany and form part of this specification, Figure 1 is a plan view. Fig. 2 is a longitudinal section. Fig. 3 is an end view from the left hand of Fig. 1, and Fig. 4 is a perspective view of the parts separated.

The quoin consists of three parts—viz., the rack A, the pronged wedge B, and the inclined plane C. The rack has at one end two lugs $a$ and $a'$, between which the lug $c$ of the inclined plane fits, as hereinafter described. The lug $a$ at its end is wider than the lug $a'$, thus forming notches $a^2$, for the purpose hereinafter explained. The projections from lug $a$, which result in the formation of said notches, as shown, are not of equal length. This is simply for the purpose of allowing the more easy separation of or uniting the parts when the prongs of the wedge are sprung apart for such purpose. Since the notches receive the prongs of the wedge, said notches are made wide enough to allow the wedge to slide with the full motion desired. The wedge also is made of one piece of metal with a slot in it extending from the thin end nearly to key-recess $b$ in the thick end of the wedge. This slot divides the wedge into two prongs $b'$ and $b^2$. The prong $b'$ is provided with a rib $b^3$, and the end of each prong is provided with a lug $b^4$ to act as stops for preventing the wedge from slipping out from between the rack and the inclined plane. The inclined plane C is provided with a lug $c$, having a notch $c'$ in one side, which notch rides along rib $b^3$ of the wedge and prevents said parts from becoming separated. The prongs of the wedge are formed to have a spring tendency toward each other, the dotted lines in Fig. 4 being intended to illustrate such spring, and said prongs will therefore grasp and press against the lugs of the rack and inclined plane and thus form a friction-lock to keep the wedge from slipping even when the quoin is not in use in a form.

The object of the lug $a'$ of the rack A is to form, in connection with the lug $a$, a recess to receive the lug $c$ of the inclined plane C, and thus prevent the rack and inclined plane from moving endwise in relation to each other. This also prevents the said two parts from twisting or turning one upon the other when not in use, owing to the somewhat close fit of the lug $c$ in said recess.

The three parts, being formed as shown, are united in the following manner: The lug $c$ of the inclined plane is inserted at an angle between the prongs of the wedge and the notch $c'$, fitted to the rib $b^3$, and the inclined plane is then turned to a position parallel with the wedge. The rack is then applied in a somewhat sidewise-tilted position, with its two lugs one each side of the lug $c$ and with the deeper recess or notch $a^2$ engaging the ribbed prong of the wedge. The other side of the rack is then pressed downward, and the prongs will yield sufficiently to allow it to be forced into its place. The reverse of this operation, first forcing the prongs apart slightly, will allow the parts to be separated, if desired. It will be seen that by this construction it will be impossible for the parts to become accidentally separated and lost.

I have not illustrated a key, as any form of key having a pinion which will enter the recess $b$ and engage the rack-teeth $a^3$ may be employed.

The lugs, rib, prongs, and notches so interlock and hold the various parts together that the usual bolts, rivets, or screws are dispensed with, and smooth and unbroken top, bottom, and sides are presented.

The quoin can be handled like one solid piece of metal, and may be put in pointing either way without affecting the lock-up, as the key always turns the same way.

The spring-pronged wedge forms an automatic safety-lock, for as the wedge advances the free ends of the prongs are brought together by the spring of the metal and grip the lugs passing between them, and thus keep the wedge from slipping. Their action is automatic, and in unlocking they spring apart as the wedge is drawn back.

Having now described my invention, what I claim, and desire to secure by Letters Patent, is—

1. In a quoin, a spring-pronged wedge, in combination with an inclined plane having a lug entering the space between the prongs of the wedge, substantially as described.

2. In a quoin, the combination, with a rack and an inclined plane having lugs projecting from the adjoining faces thereof, of a wedge having spring-prongs which embrace said lugs, substantially as described.

3. In a quoin, the combination, with a rack and an inclined plane having lugs projecting from the adjoining faces thereof, said lugs having notches in their sides, of a wedge having prongs which enter said notches, substantially as described.

4. A quoin consisting of the rack A, having lugs $a$ $a'$, the lug $a$ being provided with notches, in combination with the pronged wedge B, one of the prongs having rib $b^3$ and both prongs having lugs $b^4$ and the inclined plane C, having notched lug $c$, substantially as described.

In testimony whereof I affix my signature in presence of two subscribing witnesses.

RICHARD ATWATER.

Witnesses:
JOHN Q. THAYER,
C. C. KENNEY.